United States Patent [19]

Poe

[11] Patent Number: 5,691,076
[45] Date of Patent: Nov. 25, 1997

[54] LEAK PROOF VENTING SYSTEM FOR ELECTRIC STORAGE BATTERY

[75] Inventor: David Thomas Poe, Yorktown, Ind.

[73] Assignee: General Motors Corporation, Detroit, Mich.

[21] Appl. No.: 528,113

[22] Filed: Sep. 14, 1995

[51] Int. Cl.⁶ .................................................. H01M 2/12
[52] U.S. Cl. .................... 429/53; 429/83; 429/175
[58] Field of Search ............................ 429/53, 82, 83, 429/84, 87, 175

[56] References Cited

U.S. PATENT DOCUMENTS

| | | | |
|---|---|---|---|
| 4,348,466 | 9/1982 | Elehew et al. | 429/84 |
| 4,613,550 | 9/1986 | Jergl et al. | 429/53 |
| 5,352,545 | 10/1994 | Furukawa et al. | 429/57 |
| 5,380,604 | 1/1995 | Hampe et al. | 429/84 |
| 5,464,701 | 11/1995 | Rey | 429/53 |
| 5,498,488 | 3/1996 | Stocchiero | 429/72 |
| 5,561,001 | 10/1996 | Gurtler et al. | 429/86 |

FOREIGN PATENT DOCUMENTS

| | | |
|---|---|---|
| A-0503264 | 9/1992 | European Pat. Off. . |
| A-0570703 | 11/1993 | European Pat. Off. . |
| A-2472274 | 6/1981 | France . |

Primary Examiner—M. Nuzzolillo
Attorney, Agent, or Firm—Lawrence B. Plant

[57] ABSTRACT

A leak proof horizontal-type venting system for an electric storage battery including an exhaust chamber adjacent an exhaust port, a reservoir chamber for collecting and trapping electrolyte exiting the battery when it is laid on its end or side, and an isolation chamber between the exhaust and reservoir chambers. The reservoir chamber has inner and outer compartments formed by inner and outer partitions which partition each have an opening therein which is not aligned with the opening in the other partition, and which lies in a plane laying above a venting aperture in the floor of the reservoir chamber when the battery is oriented in certain directions and in a plane laying beneath such aperture when the battery is oriented in other directions thereby creating a maze which traps electrolyte within the reservoir chamber when the battery is tilted and becomes air locked.

4 Claims, 4 Drawing Sheets

LEAK PROOF VENTING SYSTEM FOR ELECTRIC STORAGE BATTERY

This invention relates to electric storage batteries, and more specifically to leak proof venting systems therefor.

BACKGROUND OF THE INVENTION

Pb-acid storage batteries, among others, generate gases during cycling. These gases are vented from the battery innards to the ambient via venting systems designed to permit gas passage while inhibiting the outflow of electrolyte (i.e., from innards to ambient) therethrough. Electrolyte trapped in the venting system is then drained back into the battery cells from whence it came.

There are essentially two types of battery venting systems commonly in use. These types can be classified as either vertical-type or horizontal-type depending on the orientation of the chamber used to inhibit the electrolyte outflow. In this regard, both types typically include an electrolyte trapping chamber which is located between a vent/drainage aperture that leads to the battery's electrochemical innards (i.e., plates, electrodes, separators, etc.) and an exhaust port which leads to the atmosphere. The venting/drainage aperture usually passes through the floor of the electrolyte trapping chamber and is sized to allow gas passage while minimizing entry of electrolyte splash into the trapping chamber. Nonetheless, the trapping chambers are commonly invaded by electrolyte passing up through the venting/drainage aperture as a result of excessive overcharging, sloshing, splashing, etc. (i.e., due to mishandling, vibration, tilting, or the like).

To substantially prevent electrolyte from exiting the battery, trapping chambers are typically equipped with a variety of baffles or the like to inhibit electrolyte mobility and substantially prevent its reaching the exhaust port and escaping to the ambient. Sloping chamber floors are typically used to facilitate draining back (i.e., refluxing) of the electrolyte into the innards through the same aperture from whence it came.

Discrete vent plugs found on many batteries exemplify vertical-type vent systems and typically include a deep, cylindrical chamber which fits tightly into the filler well of the battery. Separation of the electrolyte from the gas occurs primarily by gravity as the gases rise vertically through the cylindrical chamber and the electrolyte falls to the chamber floor. The floor of the chamber slopes toward a central aperture through which the gases can pass upwardly and the electrolyte can drain back into the innards. The top of the chamber has an exhaust port for discharging the gases to the atmosphere. The chamber may also contain a variety of internal baffles to prevent electrolyte from reaching the exhaust port.

Horizontal-type vent systems, on the other hand, are most frequently formed integrally with the battery cover and typically include an elongated chamber extending horizontally across at least part of the top of the battery. The vent/drainage aperture is usually located laterally remote from, and elevationally lower than, the exhaust port, and the gases passing through the vent/drainage aperture horizontally traverse much of the length of the chamber before discharge to the ambient. Such designs frequently employ a manifold so that several trapping chambers can share a single exhaust port. One such horizontal-type system is disclosed in U.S. Pat. No. 4,486,516 and is assigned to the assignee of the present invention. While horizontal-type venting systems used heretofore have been quite effective in eliminating leaks in batteries installed in the upright position, at least one automobile manufacturer is requiring batteries that will not leak after two cycles of a test in which the battery is tilted 90° from the upright so as to lay on each of its sides/ends for a period of one minute on each side/end per cycle without leaking.

SUMMARY OF THE INVENTION

A preferred embodiment of present invention comprehends an electric storage battery having a low silhouette, horizontal-type, compartmentalized, electrolyte-trapping, leak proof battery gas venting system formed integrally with the battery case's cover and capable of meeting the aforesaid test. The venting system includes:

1. an exhaust port at one end for passing the battery gases to the ambient;
2. an exhaust chamber adjacent the exhaust port;
3. an electrolyte drainage aperture at the other end for venting gases from, and refluxing electrolyte to, the battery's innards when the battery is upright;
4. inner and outer spaced-apart partitions defining a compartmentalized reservoir superjacent the drainage aperture when the battery is upright to trap electrolyte exiting from the battery's innards when the battery is tilted 90°, which reservoir has inner and outer compartments;
5. a first opening in the inner partition communicating the two compartments and lying in a plane spaced above the aperture when the battery is laying on one of its sides or ends;
6. a second opening in the outer partition (i) communicating the outer compartment with an isolation chamber of the vent system, (ii) laying in a plane spaced above the aperture when the battery is laying on the other of its sides or ends and the first opening lies in a plane beneath the aperture, and (iii) laying in a plane beneath the aperture when the battery is laying on said one of its sides or ends;
7. an isolation chamber interjacent the exhaust and reservoir chambers and having a floor which slopes from the exhaust chamber downwardly to the reservoir chamber when the battery is upright;
8. a bulkhead separating the exhaust chamber from the isolation chamber;
9. a third opening in the bulkhead intermediate the ends thereof for admitting gas into the exhaust chamber and refluxing any electrolyte therein back into the isolation chamber; and
10. a pair of baffles extending from the bulkhead into the isolation chamber on either side of the third opening so as to define a corridor for ingress of gas and egress of electrolyte to/from the exhaust chamber respectively.

DETAIL DESCRIPTION OF THE INVENTION

The invention will better be understood when considered in the light of the following detailed description of a specific embodiment thereof which is provided hereafter in conjunction with the several figures in which.

Figure 1:
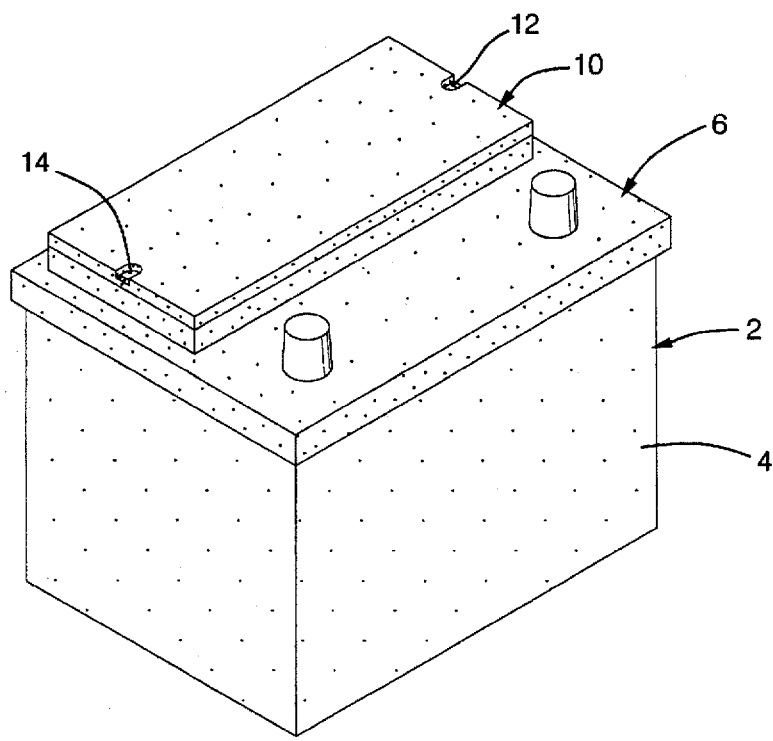
FIG. 1 is a perspective view of a battery embodying the venting system of the present invention.

FIG. 1 illustrates a battery 2 comprising a case 4 having a primary cover 6 secured to the case 4. The primary cover 6 includes a venting system 8 covered by a secondary cover 10 which includes exhaust ports 12 and 14 for passing gases from the venting system to the ambient. Each cell of the battery has its own individual overlying venting compartment 16, and the following description will be confined to a single such compartment.

Figure 5:
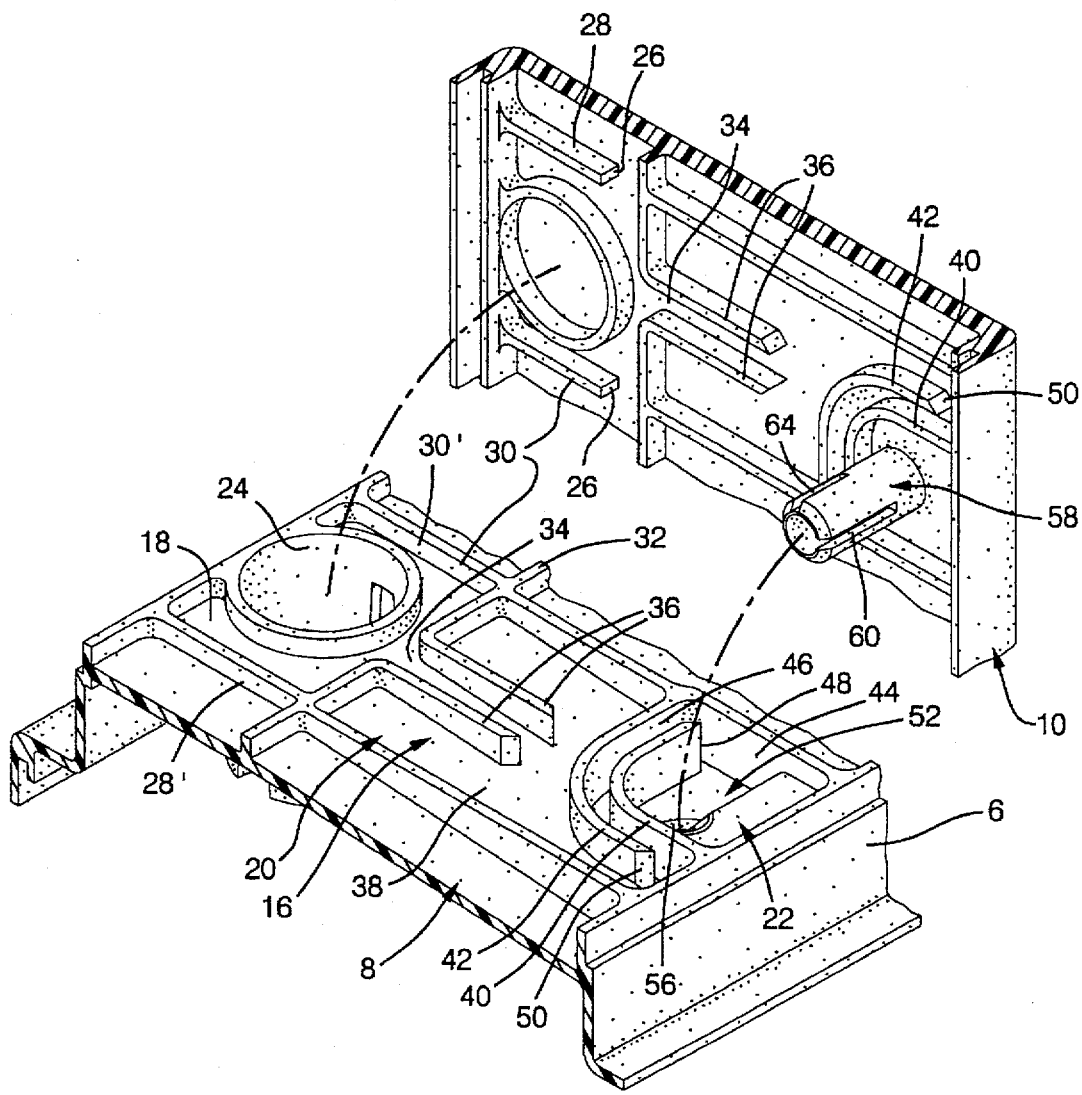
FIG. 5 is an exploded perspective view of the venting system for one cell of a multicell battery in accordance with the present invention.

Each compartment 16 is divided into an exhaust chamber 18, an isolation chamber 20 and reservoir chamber 22. A filler opening 24 is provided in the exhaust chamber 18 for admitting electrolyte into the innards during assembly of the battery. The several exhaust chambers 18 of adjacent compartments 16 communicate one with the other via openings 26 in the partitions 28 and 30 which otherwise separate the several exhaust chambers 18 one from the other. The openings 26 are themselves exhaust ports for the several exhaust chambers 18 and together with the exhaust chambers 18 form a manifold for conveying the gases to the ambient via a microporous flame arrestor 32 located adjacent the exhaust ports 12 and 14. As best shown in FIG. 5, the individual exhaust ports 26 are formed in those portions of the partitions 28 and 30 as are part of the underside of the secondary cover 10 so that the lower portions 28' and 30' of the partitions 28 and 30 can serve as barriers to prevent any electrolyte that might find its way into one exhaust chamber 18 to another exhaust chamber 18.

The exhaust chamber 18 is separated from the isolation chamber 20 by a bulkhead 32 having an opening 34 therein for allowing gas to enter the exhaust chamber 18 and, if necessary, refluxing of any electrolyte therein back to the isolation chamber 20. The opening 34 is flanked by a pair of baffles 36 forming a narrow corridor which extends into isolation chamber 20 to prevent any electrolyte that might be in the isolation chamber 20 from entering the exhaust chamber 18 via the opening 34. The isolation chamber 20 has a floor 38 which slopes downwardly from the exhaust chamber 18 toward the reservoir chamber 22 so that any electrolyte that might enter the isolation chamber 20 will flow back down toward the reservoir chamber 22 when the battery is upright.

An inner partition 40 is spaced apart from an outer partition 42 and together therewith define a reservoir 22 having an inner chamber 44 and an outer chamber 46 which lies between the partitions 40 and 42. The inner partition 40 is continuous except for an opening slot 48 at one end thereof. Similarly, the outer partition 42 is continuous except for a slotted opening 50 at one end thereof. The slotted openings 48 and 50 are not aligned with each other but rather are located at the opposite extremes of each other and provide a maze-like entry to the inner chamber 44. The reservoir chamber 22 has a floor 52 including a downwardly sloping section 54. A drainage aperture 56 is formed in the sloping section 54 of the floor 52, and is filled with a tubular plug 58 depending from the final cover 10, as best shown in FIG. 5. The tubular plug 58 includes an elongated slot 60 which extends from below the floor 52 to above the upper level 62 of the floor 52 for allowing gases to escape from the cell into the venting system. The plug 58 also includes a plurality of narrow grooves 64 for allowing any electrolyte in the reservoir chamber 22 to reflux back into the cell. The grooves 64 will preferably be of such size as to capillarily reflux the electrolyte back into the cell while at the same time resist electrolyte egress from the cell therethrough. The slot 60 in the tubular plug 58 is oriented so that it faces sloping section 54 of the floor 52. In this regard, the highest part of the slot 60 will always be maintained at a level above any electrolyte that might be trapped in the reservoir chamber 22 when the battery is in its upright position. This prevents electrolyte from entering the hollow center 63 of the tubular plug 58 and, by surface tension effects, blocking off proper breathing of the underlying cell therethrough. Such breathing of the underlying cell is important not only to vent gases from the underlying cell, but to prevent build up of pressure in the cell which would resist the refluxing of electrolyte back thereto via the several grooves 64.

The positioning of the openings 48 and 50 in the respective partitions 40 and 42 is such as to insure substantial containment of the electrolyte in the reservoir 22 when the battery is tilted on either of its sides or ends. In this regard, opening 48 will be located such that it lies in a plane spaced above the aperture 56 when the battery is tilted on either one end or one side of the battery. Hence, in FIG. 2 for example, the opening 48 will be spaced above the aperture 56 when the battery is lying on its South side (S) or its West end (W). Similarly, opening 50 lies in a plane which spaced above the aperture 56 when the battery is tilted onto either the other end or the other side of the battery. Hence, opening 50 will lie above the aperture 48 when the battery is laid on either its North side (N) or East end (E).

As best shown in FIG. 5, all of the partitions, walls, baffles and bulkhead have two components, i.e., a lower component formed in the primary cover and an upper component formed in the secondary cover. During final assembly, the secondary cover 10 is heat sealed or solvent sealed to the primary cover 6 such that the partitions, baffles, walls, and bulkhead are fused together and are continuous from top to bottom except where openings are provided to allow gas and/or electrolyte flow as discussed above. Hence for example, heat sealing the secondary cover 10 to the primary cover 6 will completely close off the filler opening 24 yet the exhaust chambers 18 can communicate with the other exhaust chambers and the external exhaust ports 12 and 14 via openings 26 and with the isolation chamber 20 via opening 34. Similarly, the isolation chamber 20 can communicate with the reservoir chamber 22 via the openings 48 and 50 at the ends of the partitions 40 and 42 respectively.

Figure 2:
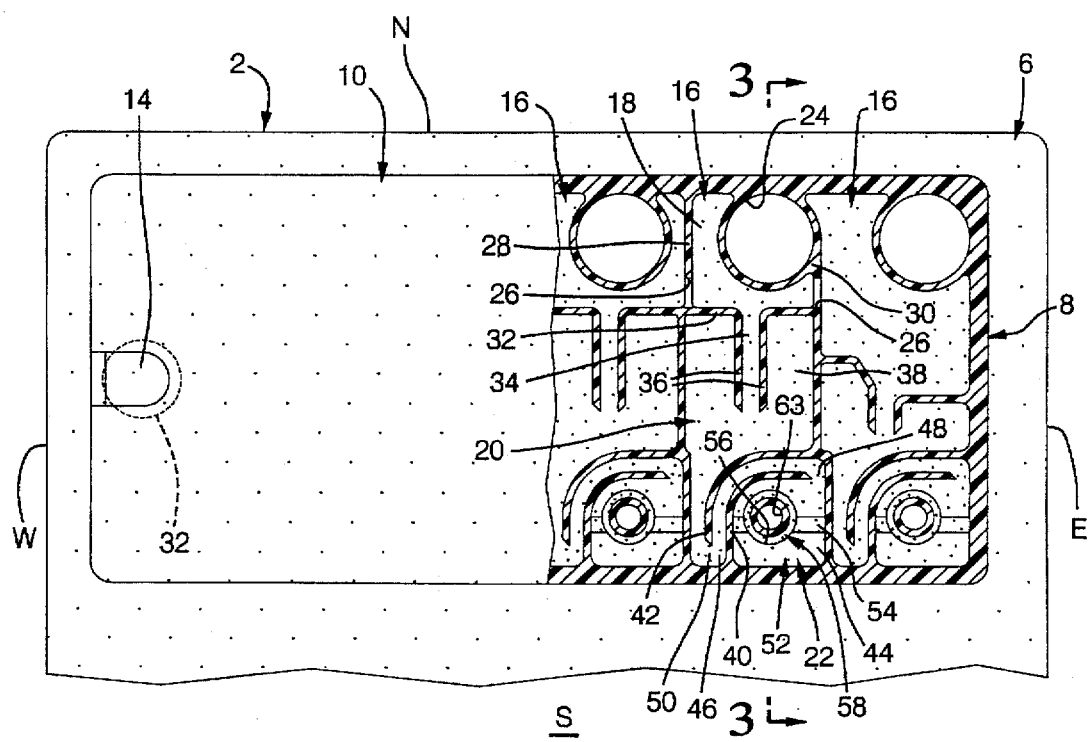
FIG. 2 is a partially broken away, plan view in the direction 2—2 of FIG. 3 of the venting system in accordance with the present invention.
Figure 3:
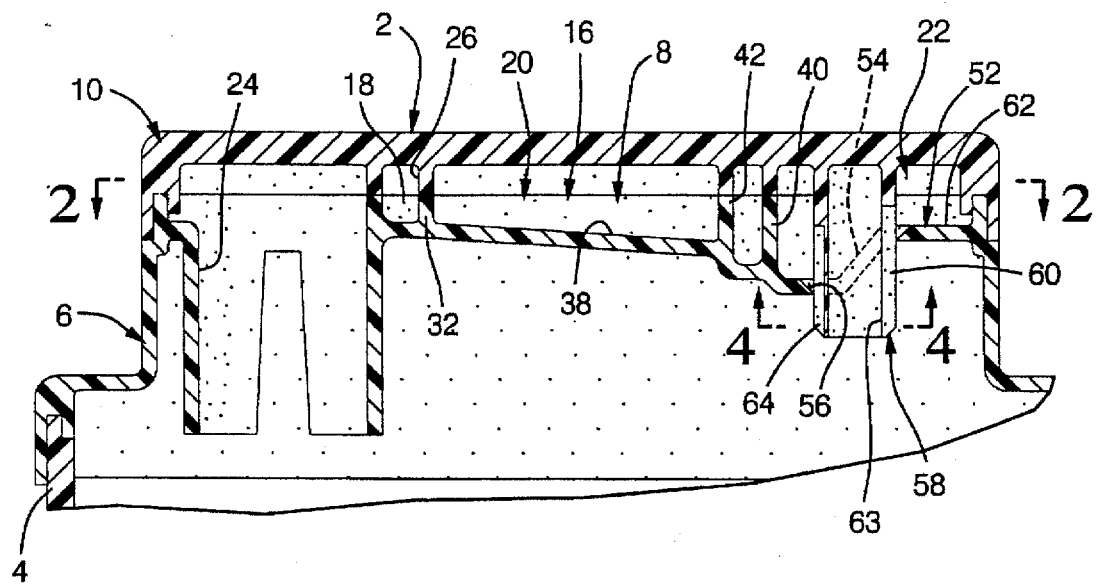
FIG. 3 is a side sectioned view taken in the direction 3—3 of FIG. 2.
Figure 4:
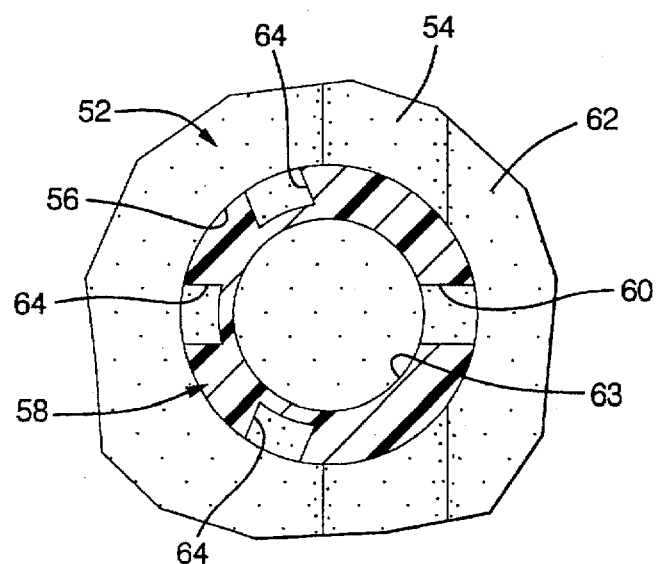
FIG. 4 is a view in the direction 4—4 of FIG. 3.
Figure 6A:
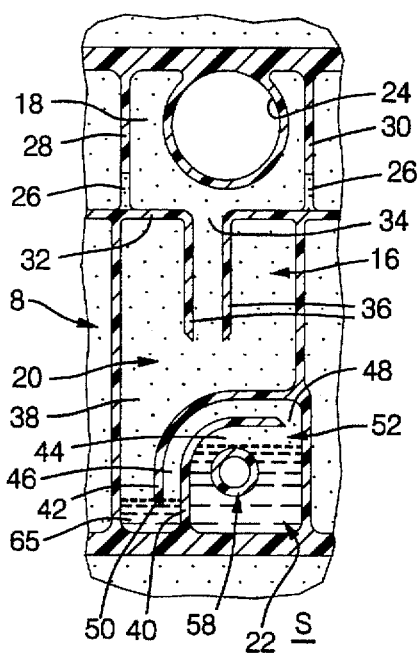
FIGS. 6A–6D illustrate electrolyte entrapment under various orientations of the battery.
Figure 6B:
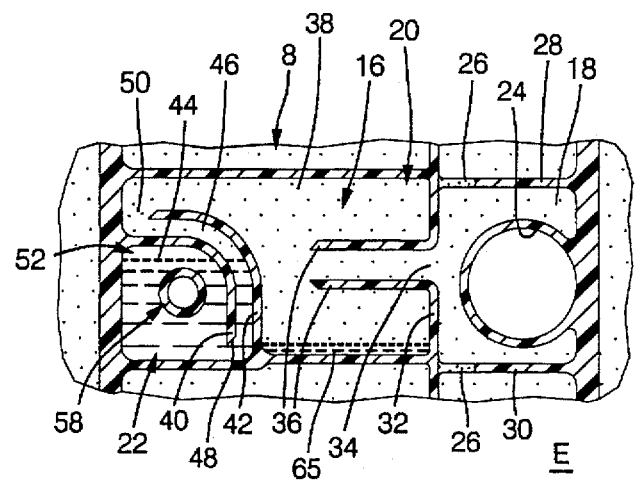
Figure 6C:
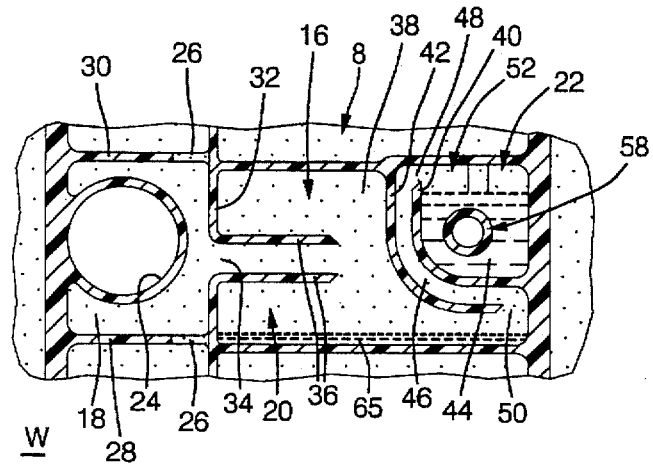
Figure 6D:
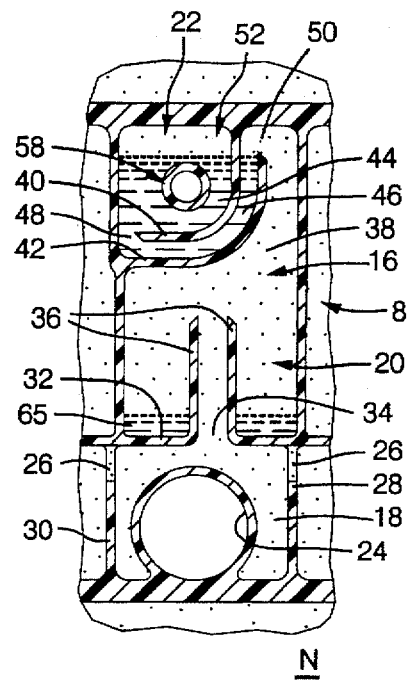

FIGS. 6A–6D illustrate how electrolyte is trapped within the venting system at four different orientations of a battery tilted 90° from its upright position (i.e., laying on its side or end). Hence and by reference to the N-E-S-W directions shown in FIG. 2, FIG. 6A illustrates the battery laying on its South side, FIG. 6B illustrates the battery laying on its East end, FIG. 6C illustrates the battery laying on its West end and FIG. 6D illustrates the battery laying on its North side. In the orientation shown in FIGS. 6A and 6C, the opening 48 in the partition 40 lies in a plane above the aperture 56 while the opening 50 in the partition 42 lies in a plane below the aperture 56. In the orientation shown in FIGS. 6B and 6D on the other hand, the opening 50 in the partition 42 lies in a plane above the aperture 56 while the opening 48 lies in a plane below the aperture 56. Regardless of which orientation is applied, when the battery is turned on its end or side electrolyte exits from the innards through the aperture 56 into the reservoir chamber 22 and begins to rise therein until the level of electrolyte therein rises higher than the aperture 56. when this occurs, the battery becomes air-locked, that is to say no air can enter the underlying cell which causes a vacuum to be formed in the cell as the electrolyte level therein drops and eventually causes the system to come to equilibrium and further, filling of the chamber 22 ceases. At this point, the level of the electrolyte in the chamber 22 will be above the aperture 56 but lower than the level of electrolyte in the cell it serves.

It is conceivable that some electrolyte may escape the reservoir 22 and become trapped in the isolation chamber 20 such as is shown at 65. Such electrolyte 65 is prevented from entering the exhaust chamber 18 by baffles 36.

While the invention has been disclosed primarily in terms of certain specific embodiments thereof it is not intended to be limited thereto but rather only to the extent set forth hereafter in the claims which follows.

What is claimed is:

1. An electric storage battery comprising a case for housing the battery's active elements, said case having a pair of opposing ends and a pair of opposing sides, a cover secured to said case and a horizontal-type vent system formed in said cover for relieving gases from the innards of the battery when the battery is in an upright position and preventing electrolyte escape therefrom when the battery is tilted ninety degrees from said upright position onto either of its ends or sides, said venting system comprising:

a. an exhaust port for passing said gasses to the ambient when the battery is in said upright position;

b. an exhaust chamber adjacent said exhaust port;

c. an electrolyte drainage aperture for venting and refluxing electrolyte from and to said innards respectively when the battery is in said upright position;

d. inner and outer partitions spaced apart one from the other and together defining a reservoir superjacent said aperture when said battery is in said upright position for trapping said electrolyte exiting from said innards when the battery is tilted said ninety degrees, said reservoir having an inner chamber surrounded by an outer chamber each separated from the other by said inner partition;

e. a first opening in said inner partition communicating said chambers and lying in a plane spaced above said aperture when said battery is tilted onto either a first said end or first said side;

f. a second opening in said outer partition communicating said outer chambers with an isolation chamber and lying in a plane spaced above said aperture when said battery is tilted onto either a second said end or second said side;

g. said first and second openings each lying in a plane beneath said aperture when the other of said openings lies in a plane above said aperture;

h. an isolation chamber interjacent said exhaust and reservoir chambers for inhibiting any electrolyte exiting said reservoir chamber from entering said exhaust chamber, said isolation chamber having a floor which slopes downwardly from said exhaust chamber toward said reservoir chamber when the battery is in said upright position;

i. a bulkhead separating said exhaust chamber from said isolation chamber; and j. a third opening in said bulkhead intermediate the ends of said bulkhead for admitting said gas into said exhaust chamber and refluxing any electrolyte that might enter said exhaust chamber back into said isolation chamber;

whereby electrolyte invading said reservoir chamber from said innards while the battery is in any of said tilted positions is trapped primarily in said reservoir chamber and prevented from migrating therefrom into said exhaust chamber.

2. An electric storage battery comprising a case for housing the battery's active elements, said case having a pair of opposing ends and a pair of opposing sides, a cover secured to said case and a horizontal-type vent system formed in said cover for relieving gases from the innards of the battery when the battery is in an upright position and preventing electrolyte escape therefrom when the battery is tilted ninety degrees from said upright position onto either of its ends or sides, said venting system comprising:

a. an exhaust port for passing said gasses to the ambient when the battery is in said upright position;

b. an exhaust chamber adjacent said exhaust port;

c. an electrolyte drainage aperture for venting and refluxing electrolyte from and to said innards respectively when the battery is in said upright position;

d. inner and outer partitions spaced apart one from the other and together defining a reservoir superjacent said aperture when said battery is in said upright position for trapping said electrolyte exiting from said innards when the battery is tilted said ninety degrees, said reservoir having an inner chamber surrounded by an outer chamber each separated from the other by said inner partition;

e. a first opening in said inner partition communicating said chambers and lying in a plane spaced above said aperture when said battery is tilted onto either a first said end or first said side;

f. a second opening in said outer partition communicating said outer chamber with an isolation chamber and lying in a plane spaced above said aperture when said battery is tilted onto either a second said end or second said side;

g. said first and second openings each lying in a plane beneath said aperture when the other of said openings lies in a plane above said aperture;

h. an isolation chamber interjacent said exhaust and reservoir chambers for inhibiting any electrolyte exiting said reservoir chamber from entering said exhaust chamber, said isolation chamber having a floor which slopes downwardly from said exhaust chamber toward said reservoir chamber when the battery is in said upright position;

i. a bulkhead separating said exhaust chamber from said isolation chamber;

j. a third opening in said bulkhead intermediate the ends of said bulkhead for admitting said gas into said exhaust chamber and refluxing any electrolyte that might enter said exhaust chamber back into said isolation chamber; and k. a pair of baffles extending from said bulkhead into said isolation chamber on either side of said third opening and defining a corridor for ingress of said gas and egress of electrolyte to and from said exhaust chamber respectively through said third opening, said baffles serving to substantially prevent ingress of electrolyte into said exhaust chamber by said electrolyte;

whereby electrolyte invading said reservoir chamber from said innards while the battery is in any of said tilted positions is trapped primarily in said reservoir chamber and prevented from migrating therefrom into said exhaust chamber.

3. A venting system according to claim 1 wherein said reservoir chamber is defined by a floor having a sloping section and said aperture passes through said sloping section.

4. A venting system according to claim 3 including a tubular plug having an outer surface closely fitted within said aperture, a slot in said outer surface contiguous said sloping section and extending from above the floor of said reservoir chamber to beneath the floor of said reservoir chamber into said innards for venting said gases above the level of any electrolyte standing in said reservoir chamber when the battery is in said upright position, and at least one small groove in said outer surface adjacent the lowermost portion of said sloping section for capillarily refluxing any electrolyte in said reservoir chamber back into said innards.

* * * * *